United States Patent [19]
Kunz

[11] 4,311,202
[45] Jan. 19, 1982

[54] ELECTRICAL BALANCE INCLUDING A TRANSVERSELY ARRANGED LOAD COMPENSATION COIL

[75] Inventor: Peter Kunz, Gossau, Switzerland

[73] Assignee: Mettler Instrumente AG, Greifensee, Switzerland

[21] Appl. No.: 141,148

[22] Filed: Apr. 17, 1980

[30] Foreign Application Priority Data

May 16, 1979 [CH] Switzerland ............... 4543/79

[51] Int. Cl.³ .................. G01G 7/00; G01G 23/48
[52] U.S. Cl. ............................ 177/212; 177/210 EM; 177/DIG. 5
[58] Field of Search ......... 177/212, 210 EM, DIG. 5, 177/DIG. 6

[56] References Cited

U.S. PATENT DOCUMENTS

| | | | |
|---|---|---|---|
| 2,602,660 | 7/1952 | Shannon | 177/212 X |
| 2,631,027 | 3/1953 | Payne | 177/212 X |
| 2,734,736 | 2/1956 | Payne | 177/212 X |
| 3,322,222 | 5/1967 | Baur | 177/210 EM |
| 3,677,357 | 7/1972 | Baumgartner | 177/212 X |
| 3,786,678 | 1/1974 | Kunz | 177/212 X |
| 3,789,937 | 2/1974 | Strobel | 177/210 |
| 3,955,638 | 5/1976 | Wasko | 177/212 |
| 4,039,036 | 8/1977 | Baumgartner | 177/212 |
| 4,043,415 | 8/1977 | Luchinger | 177/255 |
| 4,062,417 | 12/1977 | Kunz | 177/212 |
| 4,090,575 | 5/1978 | Kunz | 177/212 X |
| 4,129,190 | 12/1978 | Lechner | 177/155 |

FOREIGN PATENT DOCUMENTS 1964307 12/1969 Fed. Rep. of Germany.
2744444 4/1979 Fed. Rep. of Germany.

Primary Examiner—Joseph W. Hartary
Attorney, Agent, or Firm—Laubscher, Philpitt & Laubscher

[57] ABSTRACT

An improved balance of the electromagnetic load-compensation type is disclosed wherein, in order to improve the temperature-dependent performance of the balance and to reduce the size and amount of operating space required, the load compensation coil (54) is transversely mounted on the balance beam (36) with the plane of the coil extending normal to the longitudinal axis of the balance beam. The load-compensation system also includes a permanent magnet (74) mounted on the balance housing adjacent, spaced from and parallel with the compensation coil, the permanent magnet being magnetized in a direction causing the magnetic field lines to extend parallel with the longitudinal axis of the balance beam, whereby current flowing through the load compensation coil reacts with the magnetic field of the permanent magnet to produce a force on the balance beam that compensates for the load applied to the balance. Such an arrangement is economical to produce and is applicable, in particular, for balances having a medium degree of resolution in respect to the weighing result.

10 Claims, 5 Drawing Figures

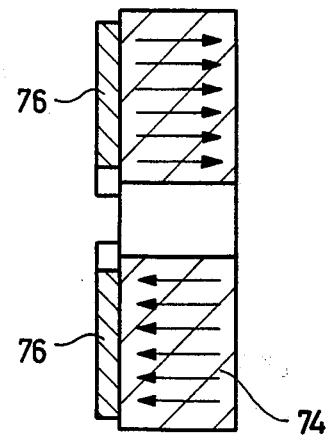
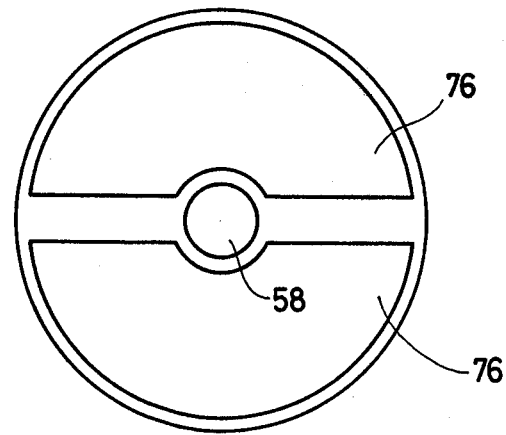
Fig. 3a          Fig. 3b
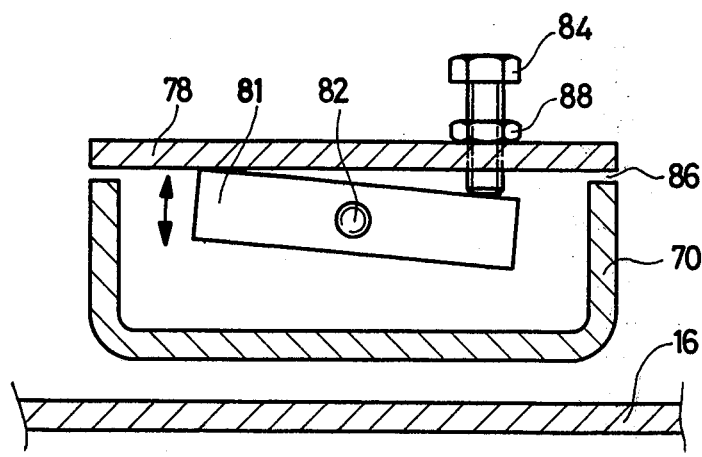
Fig. 4

ELECTRICAL BALANCE INCLUDING A TRANSVERSELY ARRANGED LOAD COMPENSATION COIL

BRIEF DESCRIPTION OF THE PRIOR ART

Weighing systems of the electromagnetic load-compensated type are well known in the patented prior art, as shown by the patents to Baumgartner U.S. Pat. No. 3,677,357, Kunz U.S. Pat. Nos. 3,786,678 and 4,062,417, Kunz et al U.S. Pat. No. 4,090,575, Strobel et al U.S. Pat. No. 3,789,937, Baumgartner et al U.S. Pat. No. 4,039,036, Lüchinger U.S. Pat. No. 4,043,415 and Lechner U.S. Pat. No. 4,129,190, among others. In Kunz et al U.S. Pat. No. 4,090,575, the vertical load bearing member is supported for vertical displacement by a pair of parallel spaced horizontal guide members. The German Offenlegungsschrift No. 1,964,307 discloses a balance apparatus including a permanent magnet system, a coil arranged in a magnetic field of the permanent magnet system, a balance housing, a balance beam mounted for movement in the balance housing, the coil being secured to the balance beam, and a position detecting means operative to detect the position of the balance beam. In this known balance, the coil is wound in a rectangular or square shape and is mounted at the end of the balance beam. The coil is so arranged that the plane of the coil extends vertically and also parallel to the longitudinal axis of the beam. The coil moves into an air gap between the pairs of poles of two horseshoe magnets whose field lines extend substantially transversely with respect to the longitudinal axis of the beam. The field cooperates with current flowing through the coil to produce a force on the balance beam to compensate for a load applied to the balance.

The known arrangement occupies a comparatively large amount of space. In addition, winding of the coil is unsatisfactory, due to its rectangular or square shape. Also, horseshoe magnets are relatively expensive. In particular, however, the behaviour of the known balance when subjected to a rise in temperature is disadvantageous; heating of the coil under load results in expansion substantially in the direction of the longitudinal axis of the beam, whereby the center of application of the electromagnetic compensation force is displaced, thereby producing a lever error.

The present invention was developed to provide a balance similar to that mentioned above, but in which the above-mentioned lever error owing to the rise in temperature of the coil is eliminated or at least alleviated. Such embodiment may also be designed to occupy a smaller amount of space and be more economical to produce than the known balance.

SUMMARY OF THE INVENTION

According to a primary object of the invention, there is provided an electrical balance including a permanent magnet system, a coil arranged in a magnetic field of the permanent magnet system, a balance housing, a balance beam which is mounted in the balance housing, the coil being secured to the balance beam, and a position detecting means operative to detect the position of the balance beam, wherein the plane of the coil is normal with respect to the longitudinal axis of the balance beam, and the field lines of the permanent magnet system, which cooperate with a current flowing, in use, through said coil to produce a force on the balance beam to compensate for a load applied to the balance, extend parallel to the longitudinal axis of the balance beam.

An important advantage of the invention is that owing to the arrangement of the coil in the transverse direction, thermal expansion occurs essentially only in the transverse direction and thus essentially does not have any influence on the distance of the point of action of the force from the pivot point of the beam.

The coil is preferably of annular form and wound on a coil carrier which is disposed on the balance beam adjacent to one end thereof, the coil being wound substantially concentrically with respect to the longitudinal axis of the balance beam. The fact that the coil is annular provides for particularly rational production and causes more uniform utilization of the coil.

The permanent magnet system advantageously comprises a disc-shaped magnetic core having two regions, one region being magnetized in a direction opposite to that of the other region. Disc magnets are substantially cheaper than horseshoe magnets and they also take up significantly less space. In this arrangement, the permanent magnet system may include a C-shaped iron plate member secured to the magnetic core by adhesive, and there may be provided an iron cover plate which closes the permanent magnet system and whose distance from the C-shaped member is adjustable to permit adjustment of the magnetic field. The possibility of adjusting the cover plate permits coarse adjustment of the sensitivity of the balance, which is to be effected, for example, when the balance is originally assembled in the factory. Fine adjustment can then be effected in a known manner by means of a rotary potentiometer when the balance is placed in operation.

A particularly compact embodiment is one in which the position detecting means includes a vane which is secured to the balance beam and which passes through a central bore in the permanent magnet system and which, on the side of the permanent magnet system remote from the balance beam, engages in a position sensing means which may operate, for example capacitively, inductively or photoelectrically.

Further measures are possible in order to achieve optimum use of the space available and to rationalize assembly, for example, securing the permanent magnet system to a wall of the balance housing and/or pivotal mounting of the balance beam on a rib in the balance housing by means of at least one bending mounting.

BRIEF DESCRIPTION OF THE DRAWINGS

The invention will now be further described, by way of exemplary and non-limiting example, with reference to the accompanying drawings, which are not to scale, and in which:

FIGS. 3a and 3b are detailed sectional and end views, respectively, of the balance of FIG. 1; and FIG. 4 is a detailed sectional view taken along line 4—4 of FIG. 1.

DETAILED DESCRIPTION

Figure 1:
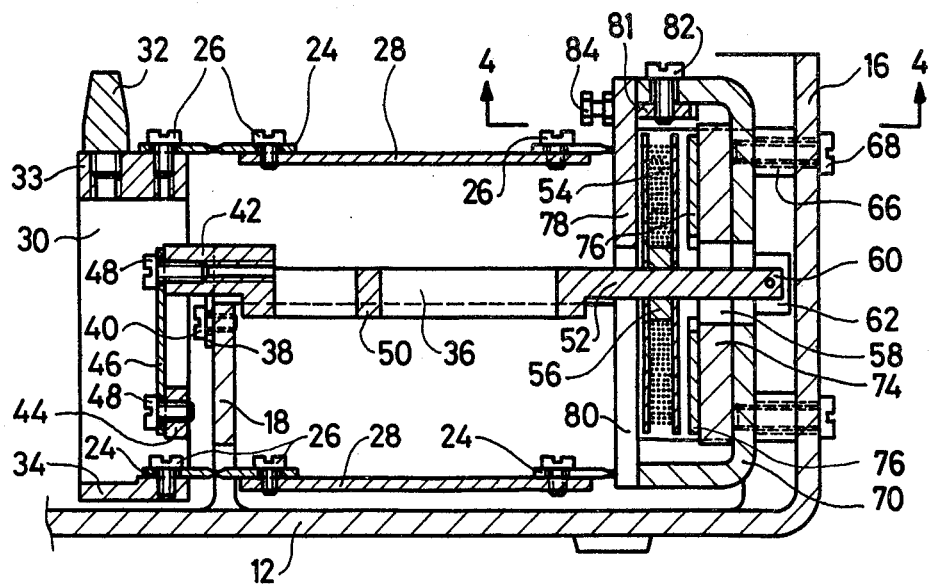
FIG. 1 is a sectional view of an electrical balance of the present invention taken along a line 1—1 of FIG. 2.
Figure 2:
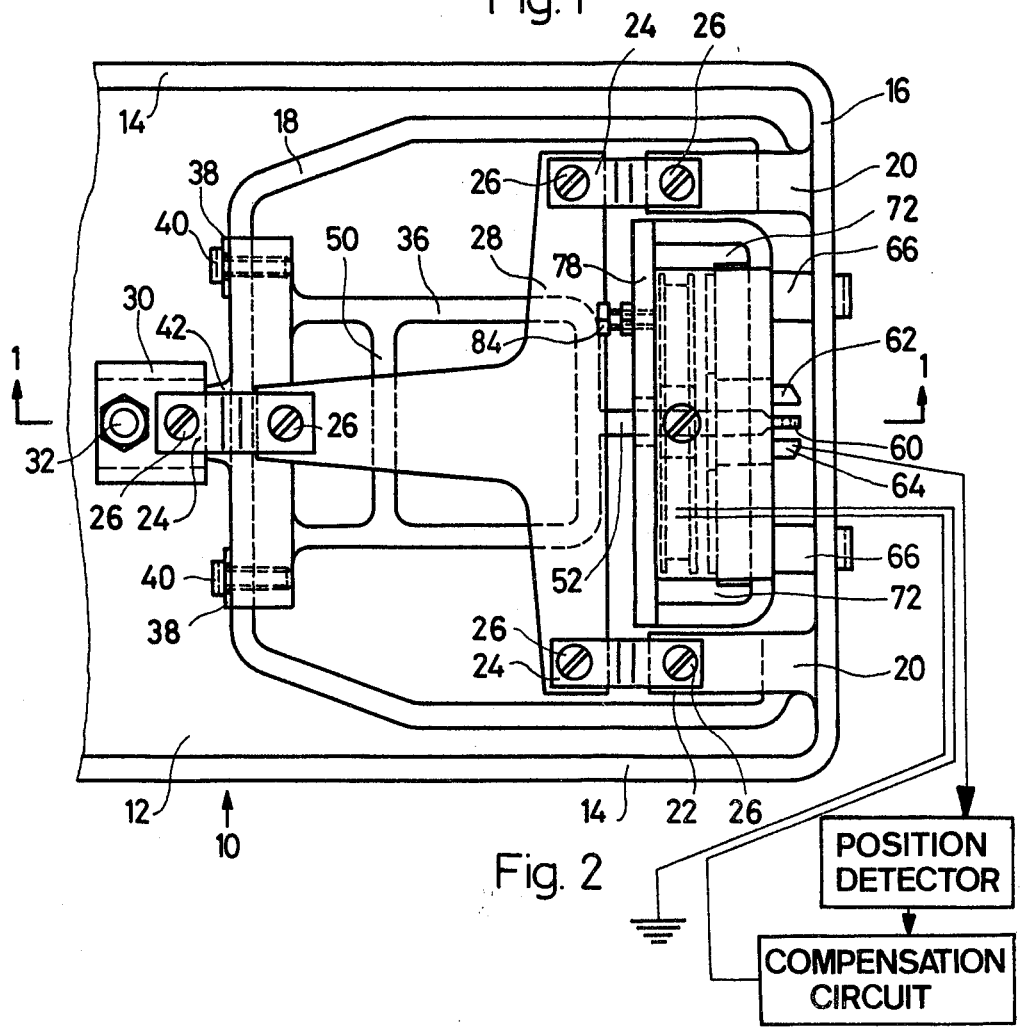
FIG. 2 is a plan view of the balance of FIG. 1 (with the cover thereof removed)

The balance selected to illustrate by way of example how the invention may be performed, which balance is shown in the drawings, is a top-pan balance with parallel-guided load-carrying means. Electrical components of the balance (current supply, control, evaluation etc. and a digital display) are not shown, since such components are conventional and are not required for comprehension of how the invention can be carried into effect. The balance is also shown without a cover and without a weighing pan.

A balance housing 10 produced by pressure casting includes in the usual way a bottom wall 12, side walls 14 and a rear wall 16. A rib 18, which is substantially U-shaped when viewed in plan view from above, is also cast integrally with the bottom wall 12. The rear wall 16 has a pair of mounting blocks 20, each having upper and lower horizontal support surfaces 22 at positions which are symmetrical with respect to the center line of the balance.

Bending mountings 24 are secured at one end by means of screws 26 to each of the support surfaces 22, respectively. At its other end, each mounting 24 is secured (by screws 26) to an end of the appropriate one of a pair of upper and lower T-shaped guide link members 28 (formed of light metal or an alloy). The two link members 28 form a parallel guide means for load-carrying means including a coupling member 30 of generally frame-like configuration, and a weighing pan (not shown) which is mounted centrally on a tapered pin 32 secured to the coupling member 30. The T-shaped guide link members 28 are each secured by their limbs by further bending mountings 24 and screws 26, respectively, to an upper transverse web portion 33 and a lower transverse web portion 34, respectively, of the coupling member 30.

A load on the balance is transmitted by the coupling member 30 to a double-armed lever 36 which acts as a balance beam or weighing beam. Two vertical bending mountings 38 connect the lever 36 to the rib 18 on the bottom of the housing, by means of screws 40, thereby defining a pivot axis for the lever 36. A bending mounting 46 mounted by means of screws 48 forms a connection between a lug 42 on the lever 36 and a transverse web portion 44 of the coupling member 30. The lever 36 includes a body portion which is stiffened by a rib 50, and an elongate stem portion 52 that extends at its free end toward the housing rear wall 16. An annular compensation coil 54 is secured to the stem portion 52 approximately halfway between the free end thereof and the lever body portion. In accordance with the present invention, the plane of the coil 54 is normal to the longitudinal axis of the lever 36. In addition to a hub portion 56, the coil 54 includes two casing discs of light metal or alloy between which the coil of wire is wound. The discs act as a coil carrier mounting the coil 54 substantially concentrically with respect to the longitudinal axis of the lever 36.

The lever stem portion 52 projects with clearance through a central bore or opening 58 in a permanent magnet system described below and at its free end terminates in a vane 60 which, in conjunction with a stationary photoelectric detecting means (i.e., light transmitter 62 and photoelectric receiver 64) forms a position detecting means providing signals to control the magnitude of the current flowing through the compensation coil 54, in known manner.

The permanent magnet system, which is secured directly to the rear wall 16 of the housing 10 by way of spacer lugs 66, includes an iron plate 70 which is formed in the shape of an open, square or rectangular box whose four corners are cut away to form respective ventilation openings 72. A disc-like permanent magnet or magnetic core 74 is secured in the box by means of adhesive, centrally with respect to the bore 58. Upper and lower iron plates 76 (FIG. 3b) are secured by adhesive to the free end face of the permanent magnet 74. The permanent magnet system is closed by an iron plate 78 which serves as a yoke and which has a downwardly open slot 80 which begins adjacent its center. The space between the yoke 78 and the permanent magnet 74, 76 constitutes an air gap in which the compensation coil 54 is disposed.

FIGS. 3a and 3b show the permanent magnet on a somewhat larger scale, arrows indicating the direction of the magnetic field lines. The magnet 74 is magnetized in such a way that the field lines in the upper half extend in a direction opposite those in the lower half. This change in the direction of the field lines, together with the direction of winding of the wire in the compensation coil 54, provides that the coil current always produces, in conjunction with the magnetic field, a downwardly directed force in the entire air gap, which force acts on the lever 36 to compensate for the load applied to the balance. The plates 76, which are of a half-moon or C-shaped configuration and which act as pole shoes, cause a certain degree of regularization of the pattern of the magnetic field lines in the air gap.

FIG. 4 shows a further detail of the present invention. A sheet metal strip 81, which is held in place by a screw 82, is provided at the upper flange of the metal plate member 70, on the inside thereof. At the level of the narrow side of the strip 81, a screw 84 passes through a screw-threaded hole in the yoke 78, which acts as a cover. Turning the screw 84 into the hole in the cover 78 causes the strip 81 to be pivoted about the axis of the screw 82 so that the top portion of the cover 78 is forced away from the sheet metal member 70 in a parallel movement. This results in an air gap 86 which tapers in a downward direction on both sides. The screw 84 can be fixed in any position by means of a lock nut 88; this makes it possible for the sensitivity of the balance to be adjusted (at least approximately), for example in final assembly of the balance.

The above-described balance is particularly suitable for medium degrees of resolution of the measurement result (for example for a display of 2 kg, with a degree of accuracy to 0.1 g).

While the preferred form and embodiment of the invention has been illustrated and described, it will be apparent that various modifications may be made in the apparatus described without deviating from the invention set forth above.

What is claimed is:

1. In an electromagnetic load-compensated weighing apparatus of the type including a housing (10), permanent magnet means (74) defining a magnetic field in said housing, a balance beam (36) mounted in said housing for pivotal movement about a horizontal pivot axis, and load compensation means including position sensing means (62, 64) connected with the housing for detecting displacement of the balance beam from an initial no-load position, and a compensation coil (54) connected with said beam and arranged for displacement in the magnetic field, thereby to cause the current flowing in the coil to react with the magnetic field of said permanent magnet means for producing on the balance beam a restoring force that compensates for a load applied to the balance; the improvement (a) wherein the permanent magnet means is magnetized horizontally in a direction normal to said beam pivot axis; and (b) further wherein the compensation coil (54) is flat and is contained in a plane normal to the longitudinal axis of said balance beam.

2. Apparatus as defined in claim 1, wherein said compensation coil is annular and is arranged generally concentrically about the longitudinal axis of said balance beam.

3. Apparatus as defined in claim 1, wherein said permanent magnet means includes an annular ferromagnetic core (74) diametrically separate halves of which are magnetized in opposite directions axially of the core.

4. Apparatus as defined in claim 1, wherein the beam position sensing means includes a vane portion (60) connected with said beam and extending through an opening (58) contained in said permanent magnet means, said position sensing means being connected with said housing on the opposite side of said permanent magnet means from the beam.

5. Apparatus as defined in claim 1, and further including means (66, 68, 70) mounting said permanent magnet means on a wall portion of said housing.

6. Apparatus as defined in claim 1, and further including at least one bending mounting device (38) supporting said beam for pivotal movement about a horizontal pivot axis.

7. In an electromagnetic load-compensated weighing apparatus of the type including a housing (10), permanent magnet means (74) defining a magnetic field in said housing, a balance beam (36) mounted in said housing for pivotal movement about a horizontal pivot axis, and load compensation means including position sensing means (62, 64) connected with the housing for detecting displacement of the balance beam from an initial no-load position, and a compensation coil (54) connected with said beam and arranged for displacement in the magnetic field, thereby to cause the current flowing in the coil to react with the magnetic field of said permanent magnet means for producing on the balance beam a restoring force that compensates for a load applied to the balance; the improvement wherein (a) said compensation coil (54) is annular, flat and concentrically mounted on said balance beam adjacent one end thereof; and (b) further wherein said permanent magnet means comprises (1) an annular ferromagnetic core (74) contained in a vertical plane parallel with said beam pivot axis, said core being concentrically arranged relative to the longitudinal axis of said beam when said beam is horizontal, the upper and lower diametrically opposite halves of said core being magnetized in opposite horizontal directions axially of said core, respectively; and (2) a pair of generally C-shaped iron plate members (76) bonded to said upper and lower core portions, respectively, on the face of said core adjacent said compensation coil, said C-shaped plate members being arranged in a circular pattern extending concentrically about the core axis.

8. In an electromagnetic load-compensated weighing apparatus of the type including a housing (10), permanent magnet means (74) defining a magnetic field in said housing, a balance beam (36) mounted in said housing for pivotal movement about a horizontal pivot axis, and load compensation means including position sensing means (62, 64) connected with the housing for detecting displacement of the balance beam from an initial no-load position, and a compensation coil (54) connected with said beam and arranged for displacement in the magnetic field, thereby to cause the current flowing in the coil to react with the magnetic field of said permanent magnet means for producing on the balance beam a restoring force that compensates for a load applied to the balance; the improvement wherein (a) said compensation coil (54) is annular, flat and concentrically mounted on said balance beam adjacent one end thereof;

(b) wherein said permanent magnet means is magnetized horizontally in a direction normal to said horizontal pivot axis; and (c) further including means for mounting said permanent magnet means on a wall portion of said housing, said mounting means including a cup-shaped iron support (70) connected with a wall of the housing and having an annular portion extending concentrically about the longitudinal axis of said beam, said permanent magnet means being mounted within and on the bottom wall of said cup-shaped support, and an iron cover plate (78) arranged across the open end of said cup-shaped member, said cover plate containing an opening (80) receiving at least a portion of said balance beam.

9. Apparatus as defined in claim 8, and further including means (81, 84) for adjusting the angular position of said cover plate (78) relative to said cup-shaped member (70), thereby to establish a variable gap (86) between said cover plate and said cup-shaped member.

10. In an electromagnetic load-compensated weighing apparatus of the type including a housing (10), permanent magnet means (74) defining a magnetic field in said housing, a balance beam (36) mounted in said housing for pivotal movement about a horizontal pivot axis, and load compensation means including position sensing means (62, 64) connected with the housing for detecting displacement of the balance beam from an initial no-load position, and a compensation coil (54) connected with said beam and arranged for displacement in the magnetic field, thereby to cause the current flowing in the coil to react with the magnetic field of said permanent magnet means for producing on the balance beam a restoring force that compensates for a load applied to the balance; the improvement wherein (a) said compensation coil (54) is annular, flat and concentrically mounted on said balance beam adjacent one end thereof; and (b) further wherein said permanent magnet means comprises an annular ferromagnetic core (74) contained in a vertical plane parallel with said beam pivot axis, said core being concentrically arranged relative to the longitudinal axis of said beam when said beam is horizontal, the upper and lower diametrically opposite halves of said core being magnetized in opposite horizontal directions axially of said core, respectively.

* * * * *